US011972679B2

(12) United States Patent
Casset et al.

(10) Patent No.: US 11,972,679 B2
(45) Date of Patent: Apr. 30, 2024

(54) HAPTIC INTERFACE WITH FLEXIBLE HINGES

(71) Applicant: COMMISSARIAT A L'ENERGIE ATOMIQUE ET AUX ENERGIES ALTERNATIVES, Paris (FR)

(72) Inventors: Fabrice Casset, Grenoble (FR); Romain Le Magueresse, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/049,342

(22) Filed: Oct. 25, 2022

(65) Prior Publication Data

US 2023/0162578 A1    May 25, 2023

(51) Int. Cl.
*G08B 6/00*    (2006.01)
*G06F 3/01*    (2006.01)

(52) U.S. Cl.
CPC .............. *G08B 6/00* (2013.01); *G06F 3/016* (2013.01)

(58) Field of Classification Search
CPC ... G08B 6/00; G06F 3/016; G06F 3/01; G06F 3/041
See application file for complete search history.

(56) References Cited

U.S. PATENT DOCUMENTS

| | | | |
|---|---|---|---|
| 9,606,625 B2* | 3/2017 | Levesque | G09G 5/003 |
| 10,229,564 B2* | 3/2019 | Ebrahimi Takalloo | H10N 30/2042 |
| 11,256,331 B1* | 2/2022 | Diest | G06F 3/0447 |
| 2012/0229401 A1 | 9/2012 | Birnbaum et al. | |
| 2013/0222310 A1 | 8/2013 | Birnbaum et al. | |
| 2017/0003440 A1 | 1/2017 | Kim et al. | |
| 2017/0005077 A1 | 1/2017 | Kim et al. | |
| 2017/0068318 A1 | 3/2017 | McClure et al. | |
| 2018/0329493 A1 | 11/2018 | Khoshkava | |
| 2022/0300076 A1* | 9/2022 | Casset | G06F 3/041 |

FOREIGN PATENT DOCUMENTS

EP    3 401 763 A1    11/2018

OTHER PUBLICATIONS

French Preliminary Search Report dated Jul. 1, 2022 in French Application 21 11291 filed on Oct. 25, 2021 (with English Translation of Categories of Cited Documents), 3 pages.

* cited by examiner

*Primary Examiner* — Toan N Pham
(74) *Attorney, Agent, or Firm* — Oblon, McClelland, Maier & Neustadt, L.L.P.

(57) ABSTRACT

A flexible haptic interface defining a tactile surface able to be contacted by a user, the interface including a plurality of rigid tactile elements connected by a flexible support forming at least one hinge extending between at least two adjacent elements, and in contact with each element, at least one actuator, the actuators being arranged to transmit a mechanical excitation to the rigid tactile elements in order to drive in vibration the hinge situated between them with a vibration amplitude detectable by touch.

20 Claims, 12 Drawing Sheets

[Fig 1]
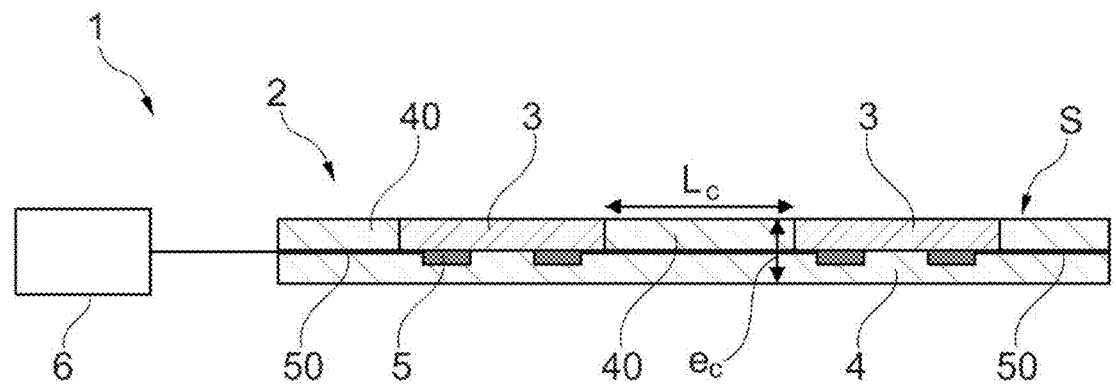
[Fig 2]
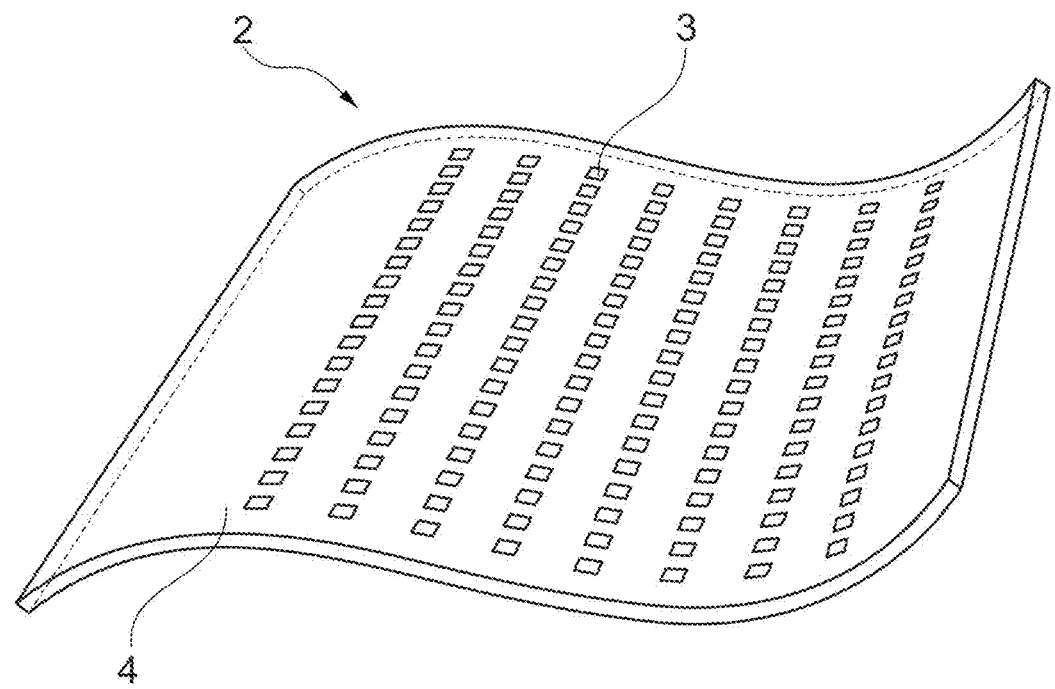

[Fig 3]
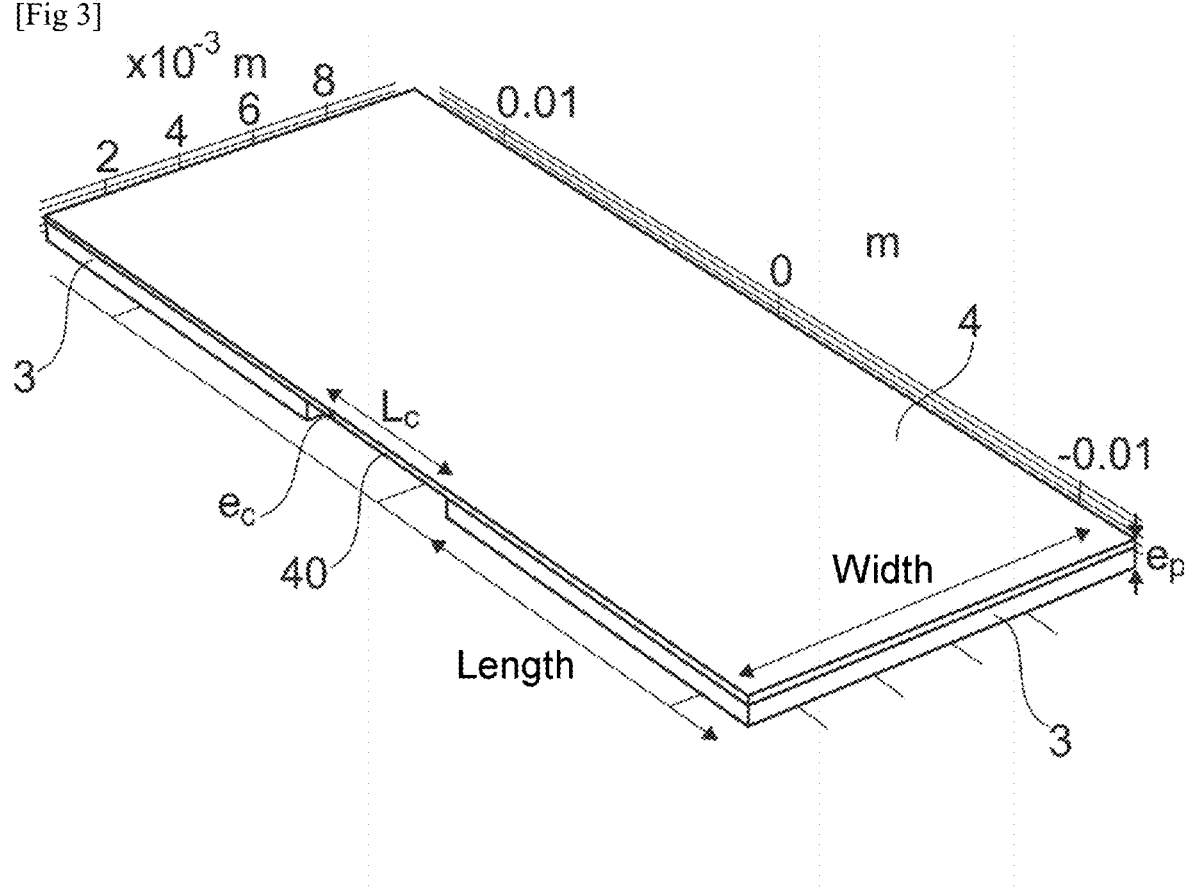
[Fig 4a]
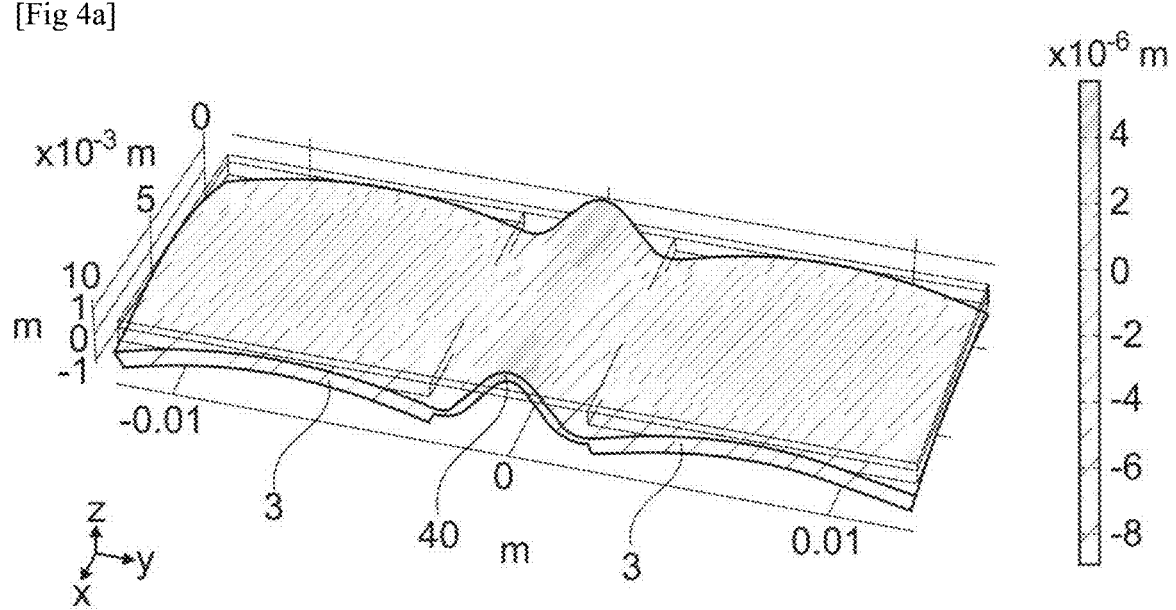

[Fig 4b]
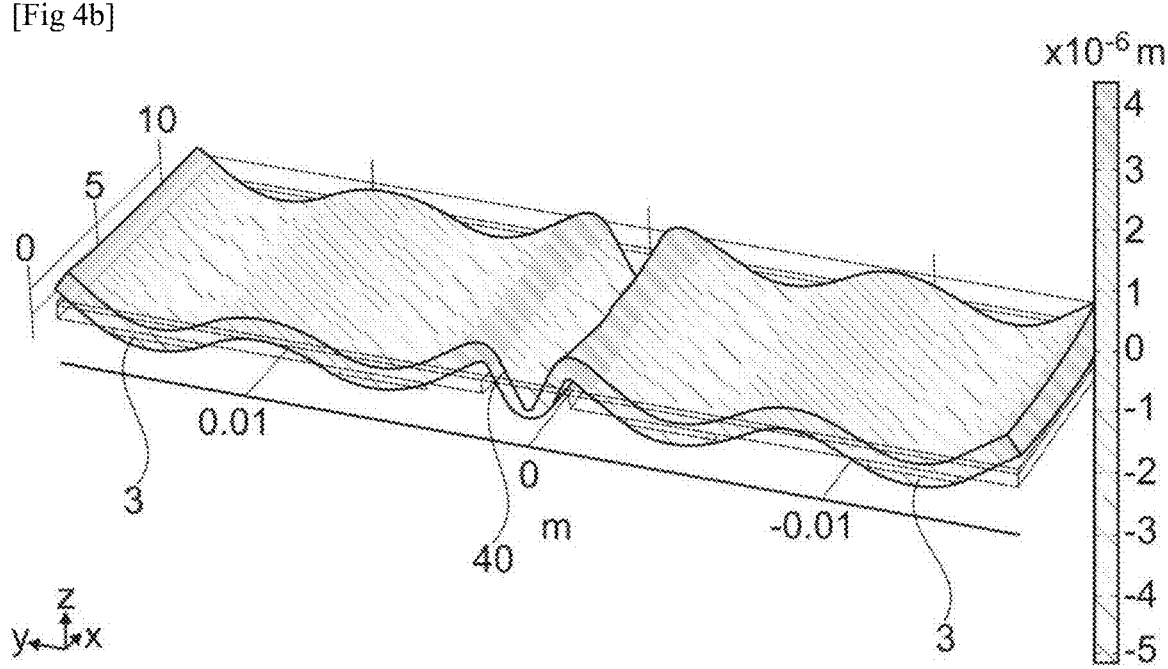
[Fig 5]
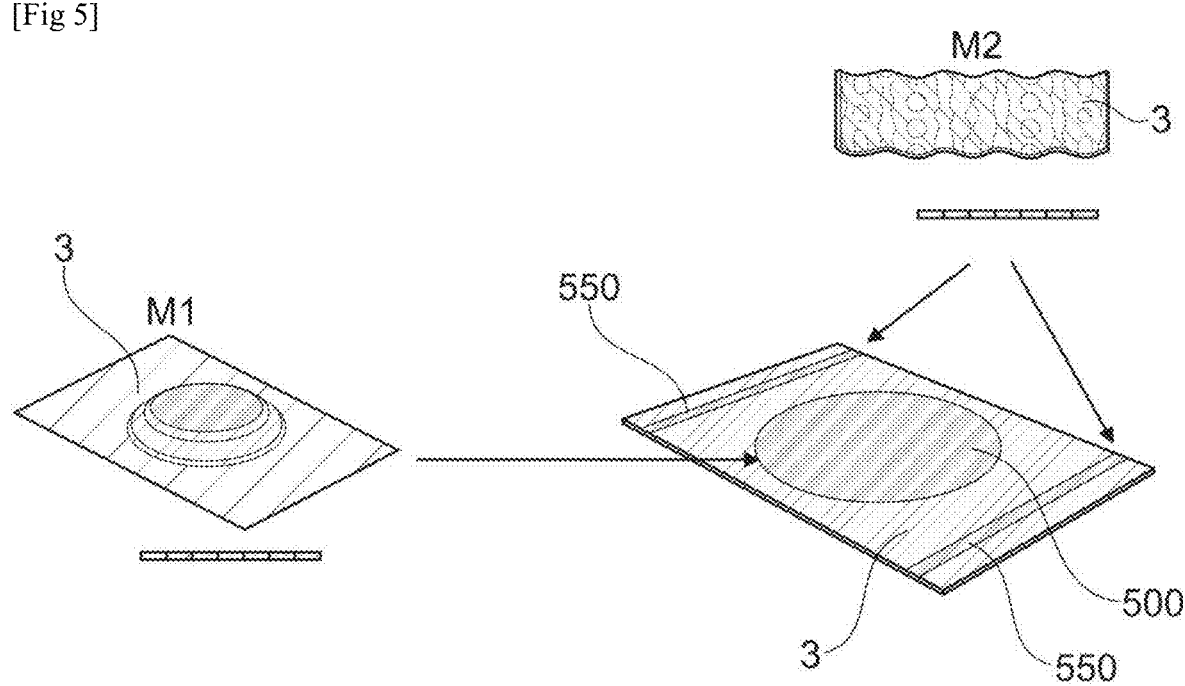

[Fig 6]
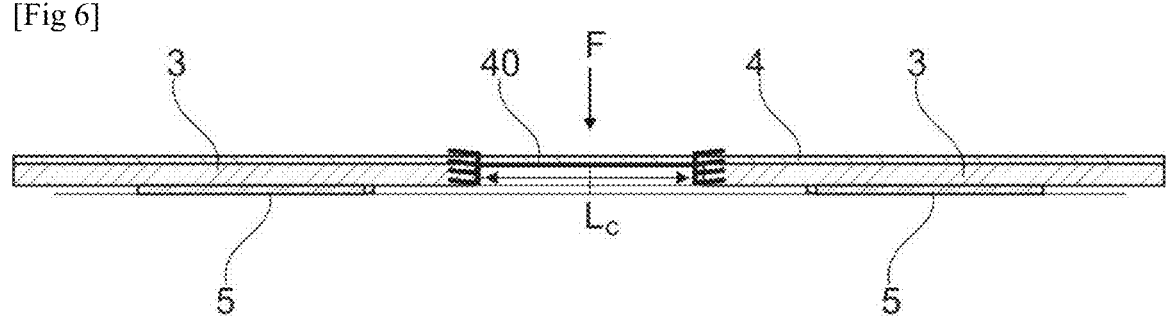
[Fig 7a]
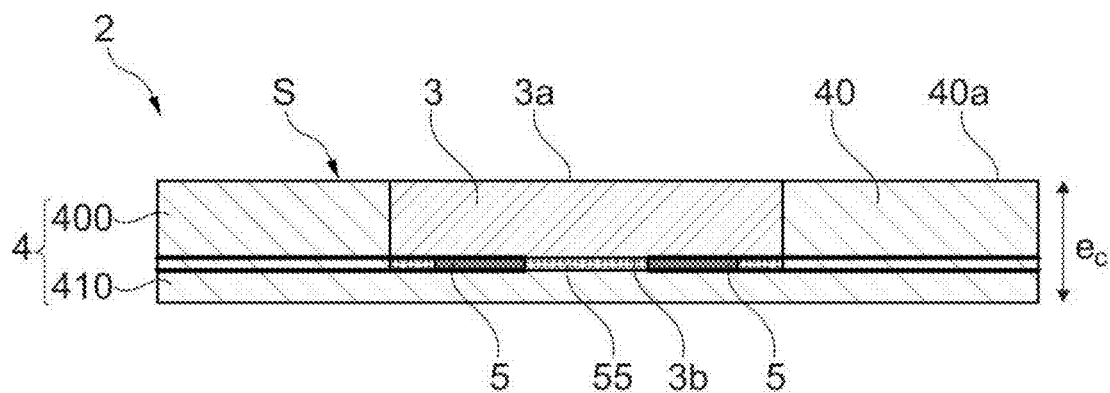

[Fig 7b]
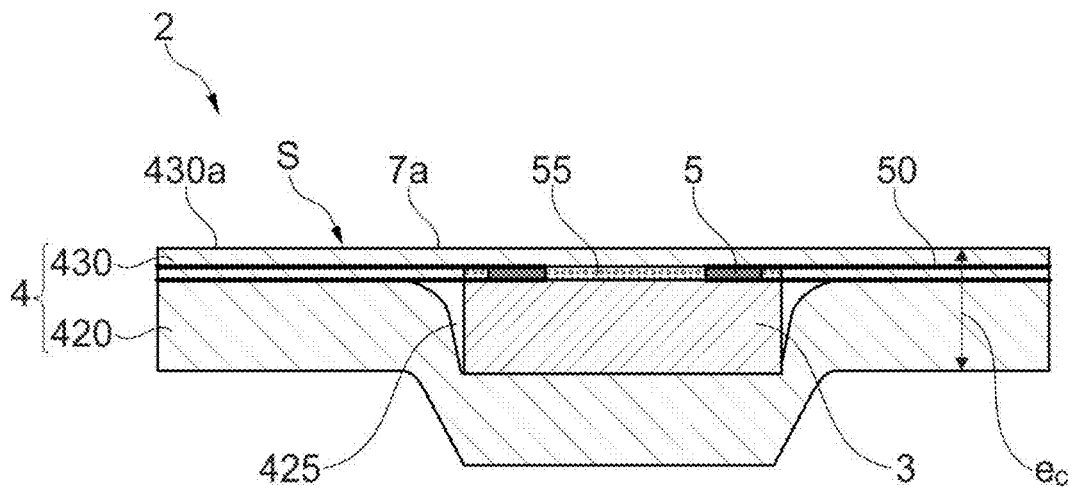
[Fig 8]
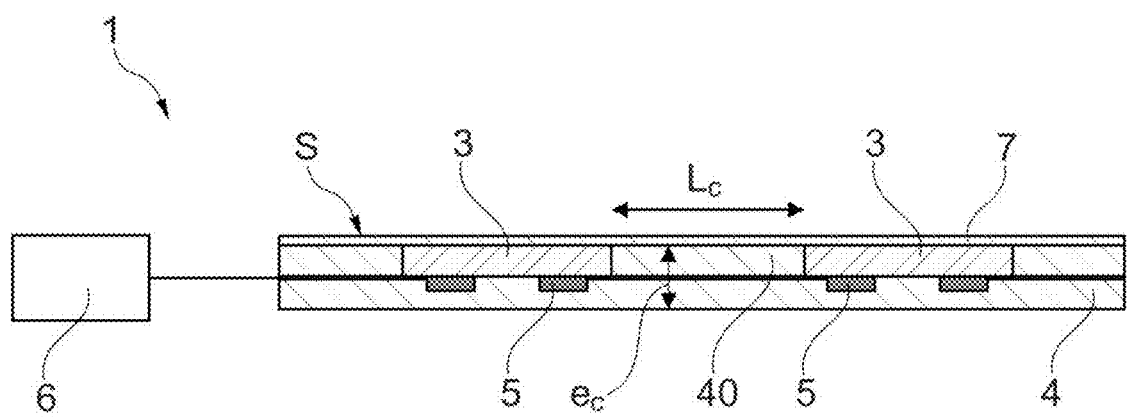
[Fig 9]

[Fig 10a]
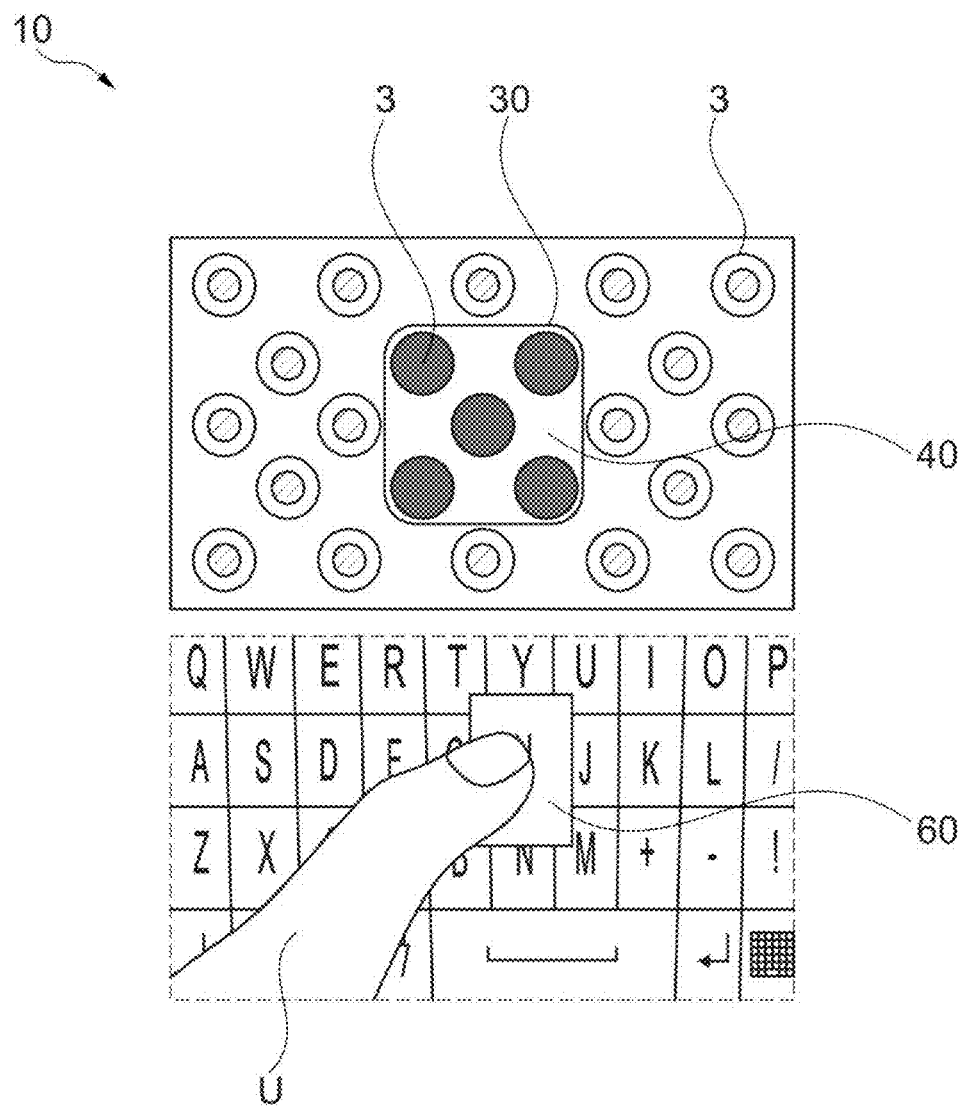

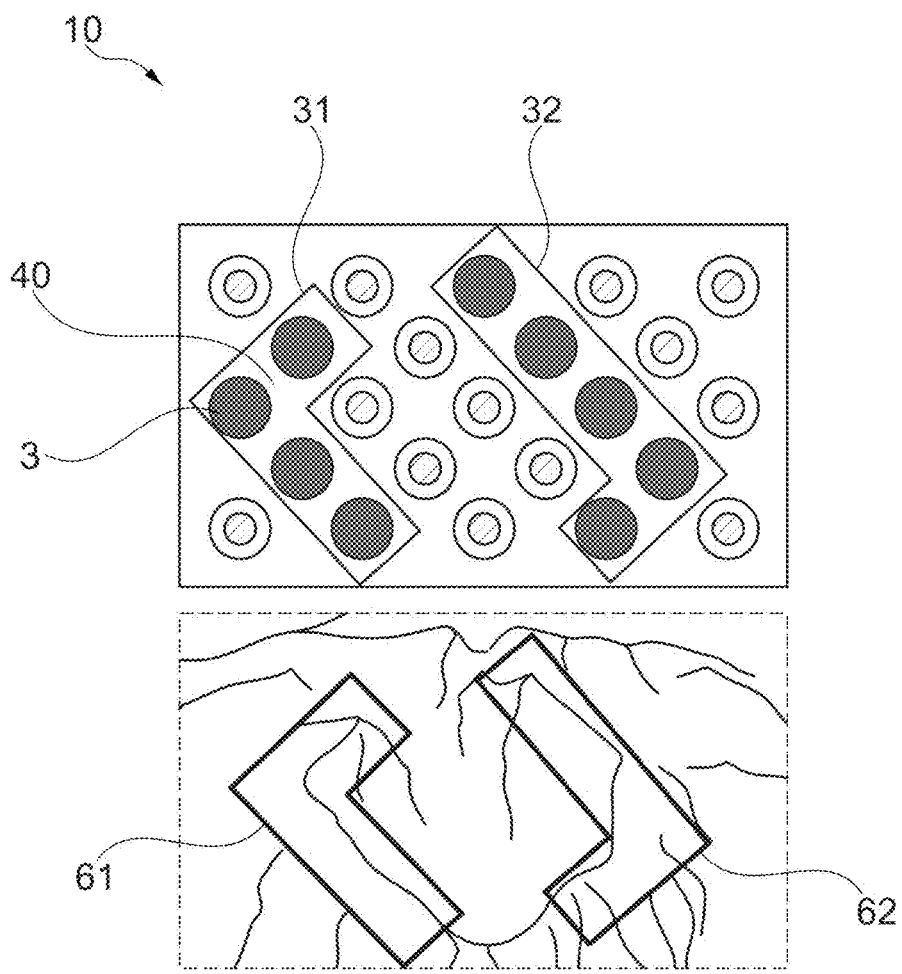

[Fig 10c]
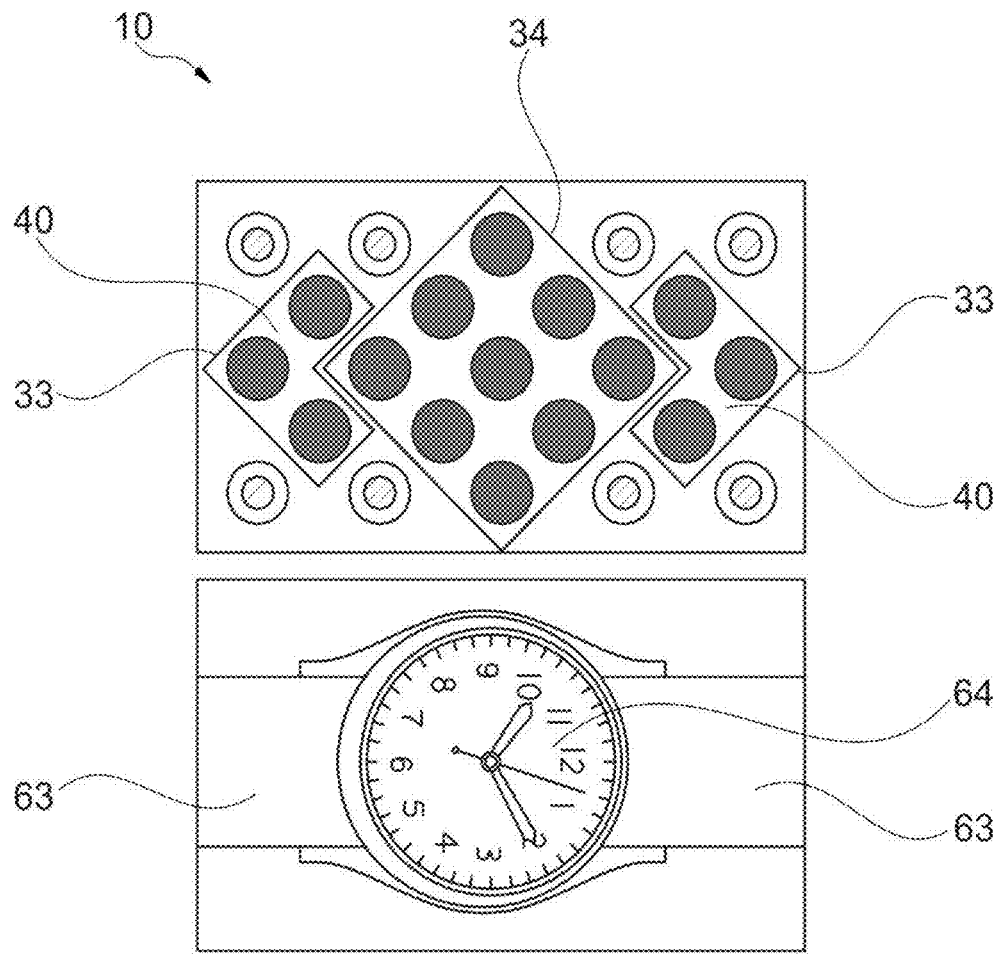
[Fig 11]
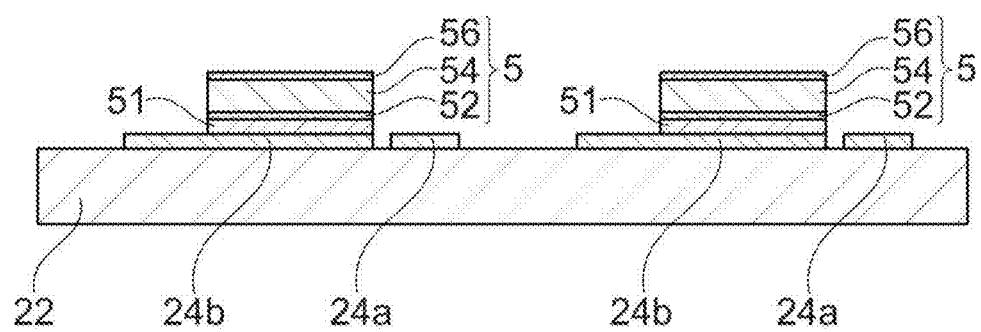

[Fig 12]
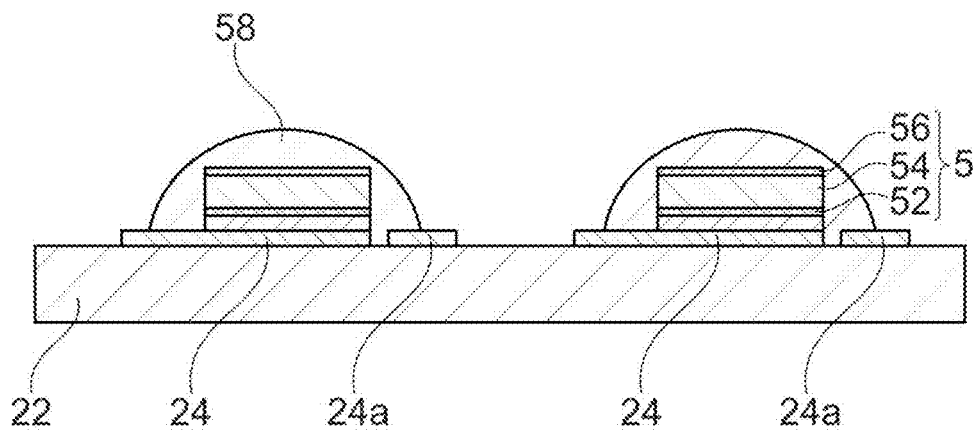
[Fig 13]
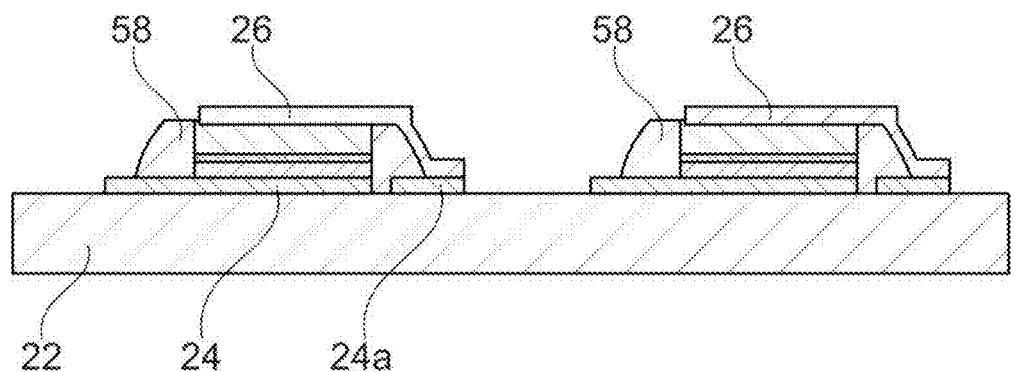
[Fig 14]
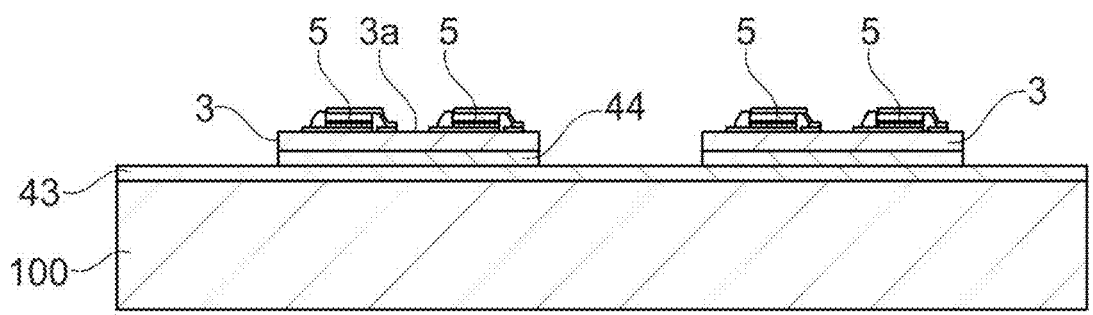

[Fig 15]
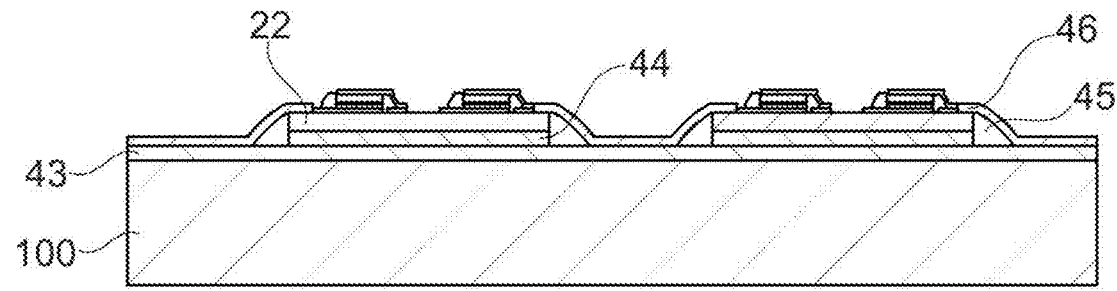
[Fig 16]
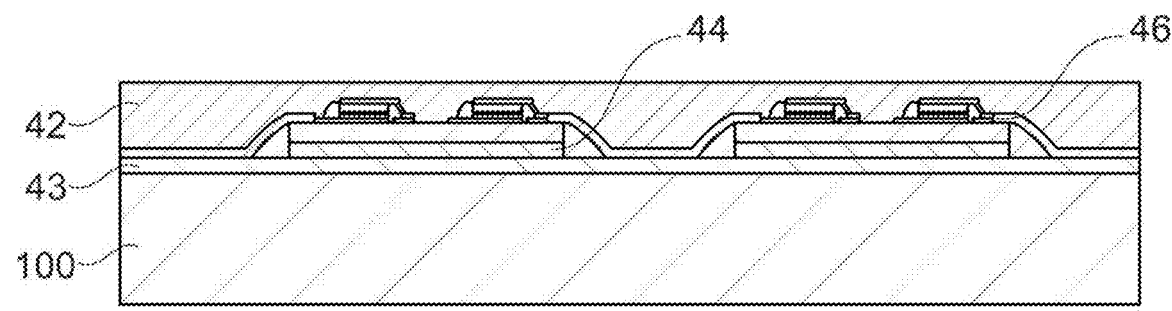
[Fig 17]
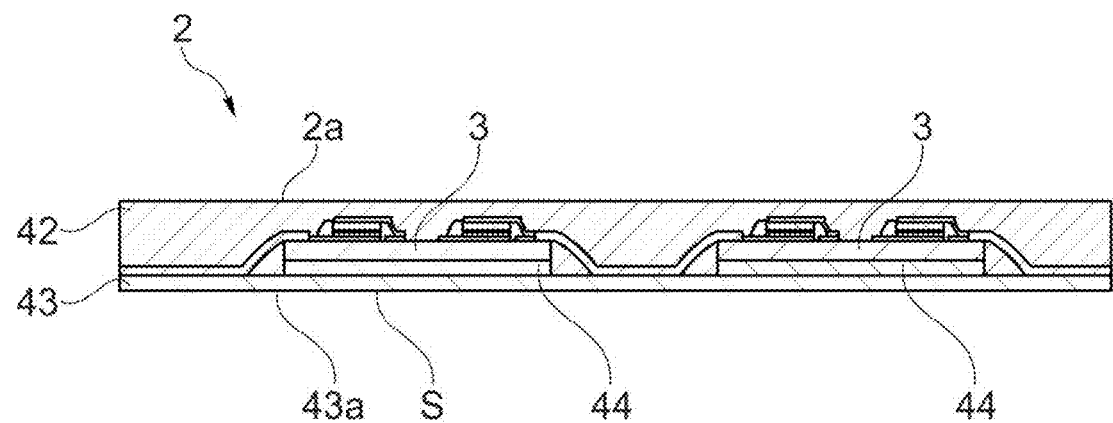

[Fig 18a]
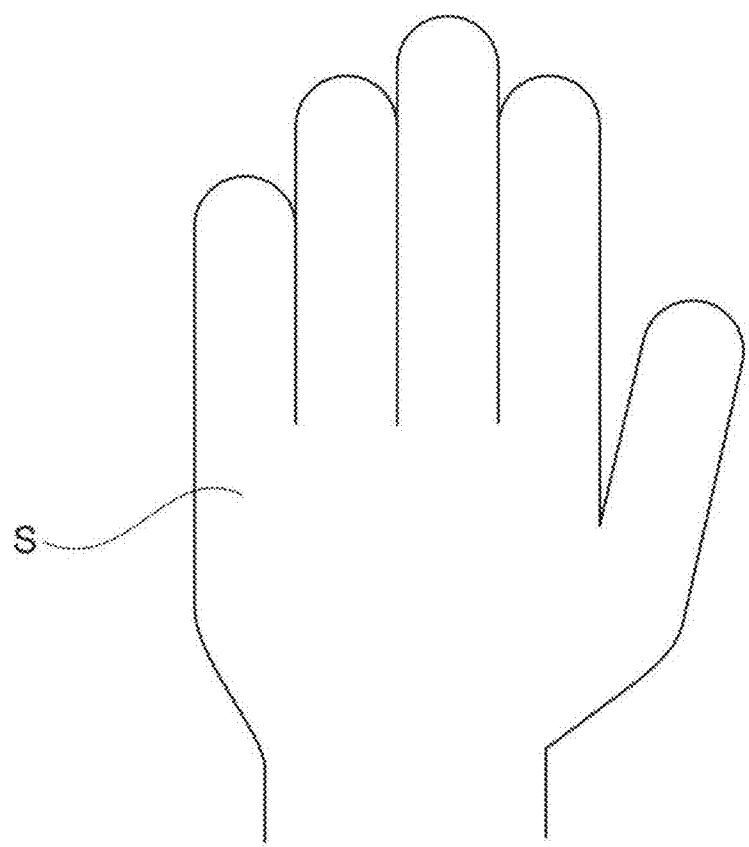

[Fig 18b]
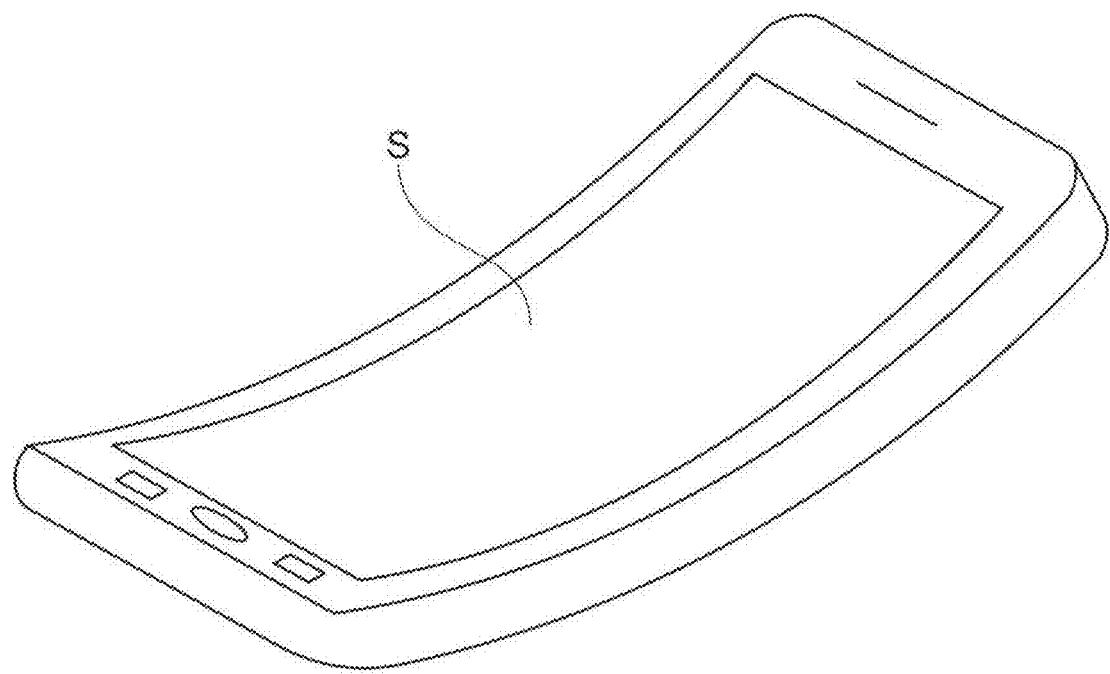
[Fig 19]
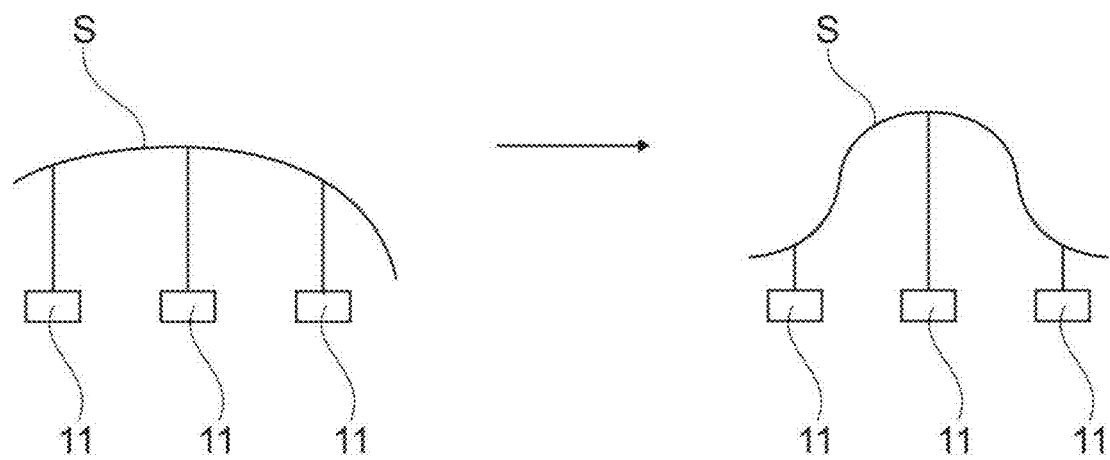

HAPTIC INTERFACE WITH FLEXIBLE HINGES

TECHNICAL FIELD

The present invention concerns human-machine interfaces and more particularly those producing haptic effects.

PRIOR ART

A haptic interface enables the user to interact with the environment through the sense of touch. Today the haptic effect is increasingly used in numerous applications, for example on a smartphone when the latter generates a slight vibration when a key displayed on the screen is pressed to simulate the impression of pressing a button. Haptic applications also exist for virtual or augmented reality devices, in particular to enable greater immersion in video games. Haptic interfaces such as tactile pads, generating a haptic effect on a tactile surface when a user contacts it, can in particular be integrated into numerous technologies such as computers, tablets and/or smartphones.

It is known to generate varied and relatively complex haptic effects on a rigid tactile surface thanks to ultrasound transducers emitting ultrasound waves that propagate on the rigid surface.

With the introduction to the market of flexible commercial products such as foldable mobile telephones and roll-up televisions, it is desirable to have flexible haptic interfaces available that can be integrated into such products.

The use of a simple flexible support carrying ultrasound transducers is however limited because the waves emitted by the transducers are in part absorbed by the flexible materials; the haptic effect generated is then difficult for a user to perceive on applying pressure with their finger or their hand on such a support.

It is moreover known to use pneumatic actuation to generate haptic effects on a flexible structure. The U.S. patent Ser. No. 10/240,688B2 discloses a flexible haptic interface including pneumatic actuators for generating a topological effect.

The paper by Yu et al. "Skin-integrated wireless haptic interfaces for virtual and augmented reality" (Nature, 2019) discloses a flexible haptic interface including magnetic actuators for generating diverse haptic effects. However, the spatial resolution of the haptic effects obtained with this kind of interface is relatively low and the use of magnetic actuators leads to high electrical energy consumption.

Finally, non-Newtonian fluids have already been used to generate simple haptic effects such as button effects and relief effects. The paper by Lochtefeld "Towards real organic user interfaces—using non-Newtonian fluids for self-actuated displays" (CHI13 workshop, 2013) describes a haptic device using a rheothickening non-Newtonian fluid between two flexible films placed on a fixed network of loudspeakers. A topology that can be perceived by the finger is generated when a soundwave propagates in the fluid and hardens it locally.

STATEMENT OF INVENTION

There exists a need for further improvement of flexible haptic interfaces, in particular in order to obtain a tactile interface capable of generating varied haptic effects and having good spatial resolution over the whole of the interface.

SUMMARY OF THE INVENTION

The invention aims to respond to this need, and achieves this, in accordance with a first of its aspects, thanks to a flexible haptic interface defining a tactile surface able to be contacted by a user, the interface including:
- a plurality of rigid tactile elements connected by a flexible support forming at least one hinge extending between at least two adjacent elements, and
- in contact with each element, at least one actuator, the actuators being arranged to transmit a mechanical excitation to the rigid tactile elements in order to drive in vibration the hinge situated between them with a vibration amplitude detectable by touch.

By "detectable by touch" must be understood that the amplitude of vibration of the hinge exceeds an amplitude of the order of 1 micron under a load comprised between 0.05 and 0.5 N.

By "transmitting a mechanical excitation to the elements" is meant inducing a vibration of the elements with an amplitude detectable by touch, the amplitude of vibration of the elements possibly being different from, in particular lower than, that of the hinge.

Thanks to the invention, because the vibration of the hinge participates, in addition to that of the excited rigid tactile elements, in the haptic effect generated by the haptic interface, it is possible to obtain haptic effects having a relatively good spatial resolution.

The benefit is therefore obtained of a haptic interface having some flexibility, whilst offering varied haptic effects generated with good spatial resolution, in particular with no significant discontinuity between the excited elements, suitable for numerous applications.

The interface preferably includes a control circuit configured to modulate the signals sent to the actuators in order to mechanically induce a vibration of the elements and of the hinges and to generate a haptic sensation on the tactile surface.

The vibration of the elements and of the hinges can generate a variation of friction detectable by touch by a user moving their finger over the tactile surface. This effect, known as the squeeze-film effect, can give the user the impression of touching a surface including reliefs or having different textures.

The vibration of the elements and of the hinges may further generate a pulse detectable by touch by a user exerting a static contact on the tactile surface. This effect for example makes it possible to give the user the impression of pressing a button.

Rigid Tactile Elements

The invention is not limited to the excitation of individual tactile elements of a particular material or having a particular shape. However, certain shapes and certain materials can facilitate the manufacture of the interface.

Accordingly, at least some of the elements, better still all the elements, may have a polyhedral, preferably parallelepipedal, general shape. The elements may in particular takes the shape of rectangular, in particular square, blades when seen from the front.

At least some of the elements, better still all the elements, are preferably made of a relatively hard and widely used material, such as glass, preferably borosilicate glass.

At least some of the elements, better still all the elements, preferably have a substantially constant thickness, preferably comprised between 50 microns and 5 mm, better still comprised between 200 and 700 microns.

At least some of the elements, better still all the elements, may have a surface area of at least 1 cm², for example an upper surface with dimensions of at least 10 mm by at least 15 mm, when the elements have a rectangular blade shape as seen from the front.

All the elements may be identical. Alternatively, there may be combined, in the same interface, individual tactile elements of different sizes, as a function for example of their location relative to the tactile surface and/or of the application.

Support and Hinges

By "support" is meant any single-layer or multilayer structure that holds the rigid tactile elements in position and assures their cohesion in the haptic interface. The support is preferably formed by one or more polymer materials, which can facilitate manufacturing and obtaining the desired flexibility of the haptic interface, whilst generating a deformation with the desired amplitude at the level of the hinges.

By "hinge" is meant the flexible portion connecting two adjacent tactile elements together. The hinges may include one or more layers depending on the structure of the support, the layers being mechanically coupled in vibration in the case of a multilayer hinge.

The support may include polycarbonate (PC), polyethylenetherephthalate (PET), polyethylenenaphthalate (PEN), polyetheretherketone (PEEK), KAPTON or any other appropriate material.

The thickness of the support may be chosen as a function of its flexibility, the softer the support the greater its thickness can be whilst enabling the desired flexibility to be preserved.

The support is preferably of substantially constant thickness at the level of the hinges, the thickness preferably being comprised between 100 and 800 microns.

The support may have an equivalent Young's modulus comprised between 0.5 and 9 GPa, better still comprised between 2 and 5 GPa.

By "equivalent Young's modulus" is meant, for a multilayer support, the mean value of the Young's moduli of the various layers weighted by the thicknesses of said layers.

The tactile elements are advantageously made of a material that is more rigid than that or those of the support. The ratio of the Young's modulus of each tactile element to that of the support is for example greater than or equal to 8, better still greater than or equal to 20, even better still greater than or equal to 50, more preferably comprised between 80 and 90, in particular equal to approximately 85.

The tactile elements may be integrated into the support in various ways, depending on the structure of the support.

The support may in particular include a supporting layer and a layer for compensating the thickness of the elements. This compensation layer extends between the elements on top of the supporting layer.

When interconnected at their interface between two adjacent elements the compensation layer and the supporting layer form multilayer hinges, in particular dual-layer hinges, between those elements.

The supporting layer may also serve as a layer protecting the tactile elements and/or the actuators with which the latter are provided.

The supporting layer preferably has a substantially constant thickness, preferably comprised between 50 nm and 500 microns, better still comprised between 25 and 80 microns, for example 50 μm.

The supporting layer may on its own provide the strength of the tactile elements within the haptic structure. The thickness compensation layer may also have this function, in combination with the supporting layer.

The tactile elements may all be situated on the same side of the supporting layer.

The compensation layer is preferably of substantially constant thickness, preferably comprised between 100 microns and 5 cm, preferably comprised between 500 μm and 5 mm, for example 1 mm.

At least some of the tactile elements, preferably all the tactile elements, may have an exterior surface leading onto the tactile surface.

This exterior surface of the tactile elements can be flush with the exterior surface of the compensation layer, the exterior surface of the elements and that of the compensation layer then defining a substantially smooth surface that can serve as a tactile surface for the interface.

The user then comes directly into contact with the tactile elements when they place their finger in contact with the tactile surface.

Alternatively the tactile elements and the compensation layer can be covered with a protection layer that may or may not be identical with the supporting layer of the support.

In this way it is possible to obtain hinges including three layers when the vibration of the protection layer is mechanically coupled to that of the underlying layers.

The thickness of the protection layer is preferably relatively small so as not to unduly affect the sensation of the tactile effect at the level of the elements.

The support may include housings in which the tactile elements at least partially extend, the latter elements being for example continuously covered by a flexible film defining the tactile surface.

In one embodiment the support includes a tactile element receiving layer, the receiving layer forming cup-shape housings, the support also including a layer covering the elements defined for example by the aforementioned flexible film.

In this embodiment it is considered that the covering layer forms part of the hinges when its vibration is coupled to that of the underlying receiving layer in the regions between the tactile elements.

The covering layer in particular makes it possible for the outside of the tactile surface to be uniform and to prevent spurious tactile sensations that could otherwise arise if the user were in direct contact with the elements and/or with the adjoining regions, the latter elements possibly forming a heterogeneous surface when touched.

Arrangement of the Tactile Elements

The tactile elements may be distributed in various ways on the support, depending in particular on the application.

The spacing between two adjacent elements may be chosen as a function of the flexibility of the support and of its thickness, so as to obtain the desired vibration amplitude for the hinge whilst preserving the overall flexibility.

The softer the support and/or the smaller its thickness, the closer together the elements may be whilst preserving an amplitude of vibration of the hinge sufficient to be detectable by touch.

The spacing between two adjacent elements (as measured edge to edge) is preferably comprised between 1 and 10 mm, better still comprised between 3 and 8 mm.

The support preferably has an equivalent Young's modulus comprised between 0.5 GPa and 8.5 GPa, and the ratio $e_c/L_c$ of the thickness $e_c$ at the level of the hinges to the spacing $L_c$ between the two adjacent elements is preferably comprised between 0.023 and 0.128. This makes it possible to obtain good results for the haptic interface.

In particular, the support may have an equivalent Young's modulus comprised between 0.5 GPa and 5 GPa, in particular of 2.2 GPa plus or minus 20%, better still of 2.2 GPa plus or minus 10%, and the ratio $e_c/L_c$ of the thickness $e_c$ of the support at the level of the hinges to the spacing $L_c$ between two adjacent elements may be comprised between 0.03 and 0.08.

Alternatively, the ratio $e_c/L_c$ of the thickness $e_c$ of the support at the level of the hinges and the spacing $L_c$ between two adjacent elements may be comprised between 0.03 and 0.1, in particular equal to 0.05 plus or minus 20%, better still 0.05 plus or minus 10%, the equivalent Young's modulus being comprised between 0.8 and 8.5 GPa.

At least some of the elements may be arranged in lines and/or in columns, in particular on the same plane when the support is laid flat, preferably in a regular array.

Alternatively, the elements are disposed in accordance with a concentric or other distribution.

Actuators

Each tactile element may be provided with at least one actuator extending over at least one face of the element, for example the face situated on the side of the support and/or its opposite face. The actuator may be disposed on a vibration antinode of the element.

Each actuator may be of piezoelectric, ferroelectric, electromagnetic or thermic type, preferably of piezoelectric type. In particular, each actuator may be a ceramic piezoelectric actuator.

The shape and the arrangement of the actuators are preferably chosen so as to obtain the desired mode or modes of vibration on the tactile element.

The actuator or actuators associated with a tactile element may each have an elongate shape, preferably in the direction of the width of the element when the latter has a rectangular shape.

The actuator or actuators may be disposed on respective opposite sides of a median plane of the tactile element. The actuator or actuators may be disposed at the level of vibration nodes or antinodes.

The actuators may be of diverse shapes; each has for example a polygonal, in particular rectangular or square, general shape, or a circular or annular shape.

A plurality of shapes of actuators may be combined on the same tactile element in order to be able to generate a plurality of different vibration modes, for example alternately, which makes it possible to obtain varied haptic effects.

The invention further has for object, independently of or in combination with the above, a haptic interface including at least one rigid tactile element, preferably of rectangular shape when seen from the front, including:
- a first actuator, preferably of annular shape, preferably disposed at the centre of the element and able to generate a first vibration mode on the tactile element, in particular a bending mode,
- at least one actuator, preferably of elongate shape, in particular elongate in the direction of the width of the element if the latter is of rectangular shape, preferably disposed at opposite ends of the element, and able to generate on the element a second vibration mode different from the first mode, in particular a Lamb oscillatory mode.

Ancillary Systems

The interface may include a system for detecting contact of the user with the tactile surface, in particular a capacitive detection structure, which is if applicable integrated into the haptic structure.

The interface may include a system enabling at least partial superposition of an image on the tactile surface. The interface may therefore include a screen, preferably a screen integrating the haptic structure.

The interface may include at least one actuator enabling selective conformation of the interface in accordance with at least two distinct shapes. This may be useful for example for changing the shape of the interface as a function of the tactile sensation to be produced, for example to improve the quality of the simulation.

The invention further has for object an item of clothing equipped with a haptic interface in accordance with the invention as defined above.

The invention further has for object a mobile device equipped with an interface in accordance with the invention as defined above.

Method for Generating a Haptic Effect

The invention further has for object a method for generating a haptic effect with a flexible haptic interface as described above, in which method rigid tactile elements are excited mechanically thanks to the actuators disposed in contact with the elements, in order to drive in vibration the hinge situated between them with a vibration amplitude that is detectable by touch.

The features of the interface described hereinabove apply to the method in combination with one another or individually.

The method in accordance with the invention may include a step consisting in first detecting the position of the contact of a user on the haptic interface thanks to a detection system and then, thanks to a control circuit, modulating signals sent to the actuators as a function of the detected position in order to excite the elements.

It is therefore possible to generate the desired haptic effect in the detected contact zone.

Excitation of the Rigid Tactile Elements

The invention is not limited to any particular mechanical excitation of the rigid tactile elements. However, certain types of excitation, and in particular certain modes of vibration of the tactile elements, facilitate causing the hinge situated between them to vibrate and enable generation of haptic effects in a relatively reliable manner.

Accordingly, the rigid tactile elements may be mechanically excited in accordance with a first so-called "bending mode" vibration mode, in particular at a frequency going from 25 to 40 kHz, in particular around 33 kHz, so as to generate bending of the hinge situated between them.

Alternatively, the rigid tactile elements may be excited mechanically in accordance with a Lamb anti symmetrical mode, in particular at a frequency comprised between 55 and 100 kHz, for example approximately 65 kHz.

More generally, the rigid tactile elements are mechanically excited at a frequency preferably comprised between 20 and 100 kHz.

The invention further has for object a method for generating a haptic sensation with the aid of an interface of the kind defined hereinabove, in which method only some of the actuators are excited selectively at a given time so as to generate a predefined vibration mode, in particular a bending or a Lamb mode; the actuators may be excited alternately to go from a bending mode to a Lamb mode and vice-versa; the actuators may also be excited differently depending on the zones of the interface, when the interface includes a plurality of such rigid elements in different zones of the interface, so that in certain zones the vibratory mode is a bending mode and in others a Lamb mode.

Production of an Individual Tactile Element

An individual tactile element provided with piezoelectric-type actuators usable in an interface as defined above may be manufactured by the method including the steps consisting in:

depositing, preferably by screenprinting, at least one first layer of a conductive material onto the upper face of a rigid support, preferably a glass support, fixing piezoelectric actuators to the first layer formed in this way so as to establish a first electric connection with the actuators, depositing a layer of an insulator on the layers previously deposited, thinning the insulating layer in order to expose the upper face of each piezoelectric actuator, depositing a layer of a conductive material on the actuators exposed in this way so as to establish a second electrical connection with the actuators, cutting the support so as to obtain tactile elements each provided with one or more piezoelectric actuators.

This method in particular enables simple manufacture of a plurality of tactile elements based on the same support, for example a glass plate.

The tactile elements obtained in this way can then be mounted on a flexible support to form a haptic interface.

A haptic interface as defined above is manufactured for example by the method including the steps consisting in:

depositing a first layer of flexible material, preferably of polymer, on a manufacturing support, fixing tactile elements provided with one or more actuators onto the layer deposited in this way, the actuators being disposed on the exterior face of the elements, electrically connecting each actuator to the control circuit, preferably by masking and spraying a conductive material, covering the tactile elements and actuators with a flexible material, preferably a polymer film, and separating, in particular peeling, the assembly produced in this way from the manufacturing support so as to expose the lower face of the first layer.

This first layer may constitute the aforementioned cover layer and the flexible material deposited on the elements may constitute the aforementioned receiving layer.

BRIEF DESCRIPTION OF THE DRAWINGS

The invention might be better understood upon reading the following detailed description of non-limiting embodiments thereof and examining the appended drawings, in which:

FIG. 1 represents partially and schematically an example of a haptic interface in accordance with the invention, FIG. 2 represents partially and schematically an example of a haptic interface including tactile elements arranged in a matrix, FIG. 3 illustrates partially and schematically in perspective a haptic structure including two tactile elements connected by a portion of a flexible support forming a hinge, FIG. 4a illustrates the causing of the hinge from FIG. 3 to vibrate based on a bending mode of the tactile elements, FIG. 4b illustrates the causing of the hinge from FIG. 3 to vibrate based on a Lamb mode of the tactile elements, FIG. 5 illustrates the possibility of generating two vibration modes on a tactile element provided with varied piezoelectric actuators, FIG. 6 represents partially and schematically a flexible hinge situated between two elements and subjected at rest to a vertical force at its centre, FIG. 7a illustrates partially and schematically an example of integration of the tactile elements into the interface, FIG. 7b is a view analogous to FIG. 7a of another example of the integration of the tactile elements, FIG. 8 represents partially and schematically an example of a haptic interface equipped with an ancillary system, FIG. 9 is a block schematic illustrating an example of the operation of the haptic interface in accordance with the invention, FIG. 10a illustrates partially and schematically the possibility of generating a button tactile effect based on an interface in accordance with the invention, FIG. 10b illustrates partially and schematically the possibility of generating a relief tactile effect based on an interface in accordance with the invention, FIG. 10c illustrates partially and schematically the possibility of generating a texture tactile effect based on an interface in accordance with the invention, FIG. 11, FIG. 12 and FIG. 13 illustrate partially and schematically successive steps of an example of a method for manufacturing tactile elements with their actuators, FIG. 14, FIG. 15, FIG. 16 and FIG. 17 illustrate partially and schematically successive steps of an example of a method for manufacturing a haptic interface, FIG. 18a represents an example of an item of clothing equipped with a flexible haptic interface in accordance with the invention, FIG. 18b illustrates an example of a mobile device equipped with a flexible haptic interface in accordance with the invention, and FIG. 19 illustrates the possibility of modifying the shape of the interface by means of actuators.

DETAILED DESCRIPTION

There is shown in FIG. 1 an example of a flexible haptic interface 1 usable for the execution of the method in accordance with the invention. The interface 1 includes a haptic structure 2 defining a tactile surface S adapted to be contacted by a user and on which a haptic effect can be generated.

The haptic structure 2 includes rigid tactile elements 3 carried by a flexible support 4. The tactile elements 3 are for example made of glass, in particular borosilicate glass, or silicon.

The flexible support 4 forms hinges 40 that extend between the tactile elements 3.

In the example considered here the tactile elements 3 are provided with a plurality of actuators 5, preferably piezoelectric actuators, the latter being connected to a control circuit 6 by means of electrical connections 50.

The control circuit 6 is configured to modulate the signals sent to the actuators 5 in order to induce vibrations of the latter mechanically and to excite the tactile elements 3 mechanically.

Excitation of two adjacent tactile elements 3 causes the hinge 40 situated between them to vibrate.

The disposition of the tactile elements 3 on the flexible support, and in particular the spacing $L_c$ between two adjacent pixels, is chosen so that when the tactile elements 3 are excited mechanically by means of the actuators 5 the resulting amplitude of vibration of the hinges 40 is detectable by touch.

Thanks to the invention the hinges 40 and the tactile elements 3 may be acted upon at the same time to generate the required haptic effect, which, if required, makes it possible to obtain for the user in contact with the tactile surface S a substantially continuous tactile perception over the contact zone and/or of enhanced resolution.

The haptic structure 2 may be of any shape and of varied size. Its dimensions are for example, depending on the application, of the order of the cm, of the dm or of the meter.

The tactile elements 3 may have a varied shape as seen from the front, for example a rectangular, square, circular or other shape. Their greatest dimension is for example comprised between a few hundred microns and a few cm per side, preferably from 2 mm to 1 cm per side.

The tactile elements 3 may be distributed over the support 4 in accordance with diverse configurations.

For example FIG. 2 shows identical tactile elements 3 distributed in lines and columns on the support 4 in a regular array.

In other embodiments (not shown) the interface 1 includes tactile elements of different sizes and/or shapes, or again tactile elements 3 disposed in accordance with a concentric distribution or a quincunx.

In particular the size of the tactile elements may be varied in order to generate haptic effects producing tactile simulation of larger or smaller patterns.

The tactile elements 3 are disposed on the support 4 so that the haptic structure 2 preserves an overall flexibility in at least one direction, and better still in all directions.

Nevertheless, as mentioned above, this disposition is subject to certain constraints to obtain effect perceptible by the user by touch. It is considered that vibration of the hinges or of the tactile elements is perceptible by touch if its amplitude exceeds 1 micron under a load comprised between 0.05 and 0.5 N.

The amplitude of vibration of a tactile element 3 depends, inter alia, on its dimensions, on its stiffness and on the vibration mode in which it is activated.

The amplitude of vibration of a flexible hinge 40 situated between two excited tactile elements depends for example on its thickness $e_c$, on the characteristics of the material or materials constituting the flexible support 4 at the level of that hinge, and on the spacing $L_c$ between the two elements.

There will now be described with reference to FIGS. 3 to 7a and 7b an example of the dimensioning of a flexible hinge 40 situated between two rigid tactile elements 3.

As shown in FIG. 3, for this example there are considered two tactile elements 3 carried by a flexible support 4, the hinge being formed by the portion of the support that extends between the elements 3.

The tactile elements 3 are identical, for example made of glass and of rectangular blade shape of width Width of approximately 10 mm, length Length of approximately 15 mm, and thickness $e_p$ of approximately 500 microns.

The flexible support 4 is for example a polymer film of thickness $e_c$, disposed on the elements 3 and forming between them a flexible hinge 40 of width $L_c$ and of length approximately equal to the width Width of the elements 3.

The support 4 is for example a polymer of mass per unit volume p, Young's modulus E and Poisson's coefficient v.

The tactile elements 3 are each provided with one or more actuators 5, as can be seen in FIG. 7a. Thanks to the actuators 5 the tactile elements 3 can be made to vibrate in vibration modes adapted to generate haptic effects at the level thereof.

The tactile elements 3 are excited for example in a first, so-called "bending mode", vibration mode, for example at a frequency of 33 kHz. The tactile elements 3 excited in this way can then drive bending of the flexible hinge 40, as shown in FIG. 4a. In this way there is obtained a surface S of the haptic structure 2 vibrating all over, that is to say at the level of the hinges and of the tactile elements 3.

Alternatively, the tactile elements 3 are excited in a Lamb antisymmetric mode, for example a Lamb mode at 65 kHz, driving the flexible hinge 40 in vibration with an amplitude greater than that of the vibration of the tactile elements 3, as shown in FIG. 4b.

The vibration modes such as those that have just been described can be obtained using piezoelectric actuators, for example lead zirconate titanate (PZT) actuators.

The dimensions of the actuators and their disposition on the tactile elements 3 can be adapted by means of numerical simulations, for example using finite element type methods on commercial software such as COMSOL or ANSYS.

There may also be employed the method described in the paper by Casset, F. et al. "Low voltage actuated plate for haptic applications with PZT thin-film" (Proceedings of Transducers, 2013).

For example some actuators 5 may be disposed on a tactile element 3 so as to be able to generate a plurality of vibration modes, for example the aforementioned two vibration modes, namely a bending mode M1 and a Lamb mode M2 as shown in FIG. 5.

In this example the tactile element 3 is provided with a central actuator 500 of circular shape and two actuators 550 of elongate shape at its ends, the latter extending in the direction of the width Width of the actuator.

The actuators 500 and 550 may be energised in turn, for example by a potential difference of 50 V, in order to exploit a certain vibration mode.

The circular actuator 500 makes it possible for example to use the bending mode of the tactile element 3, while the actuators 550 generate the Lamb mode, for example at a frequency of 50.7 kHz.

These two vibration modes enable a displacement of at least 1 micron at the centre of the tactile elements 3.

Of course, other actuator configurations are possible for obtaining the desired vibration modes. Rectangular actuators are preferably used to obtain a Lamb mode and square and/or circular actuators to obtain an out-of-plane mode such as the bending mode.

The support 4 being preferably made of a polymer material, that is to say is much more flexible than the tactile elements 3, a vibration amplitude of the hinges 40 is naturally obtained that is higher than that of the tactile elements 3 that are rigid.

Nevertheless, for the vibrations to be perceptible by touch, the hinges 40 must have some rigidity so as to be able to be deformed even when they are subjected to a force exerted by the user at the moment of contact.

To determine the material and the dimensions of the hinges enabling an effect of this kind, a static analysis is effected for example with the hinge considered as an elastic beam built in at both ends subject to a vertical force F, as shown in FIG. 6 for the system described above.

According to beam theory, the deformation equation of the hinge is:

$$FL_c^3 = 192E\, I_{gz} f$$

where $$I_{gz} = \text{Width} * \frac{e_c^3}{12}$$

is the quadratic moment of the hinge about the deformation axis, Width being the length of the hinge, $e_c$ its thickness and $L_c$ its width. E is the Young's modulus of the hinge and f the deformation at its centre.

In this example it is considered that the force F applied by the finger to the hinge is comprised between 0.05 N and 0.5 N, the tactile detection threshold for a finger exerting a normal force on a tactile surface being approximately 0.05 N, as described in the paper by King et al. "Perceptual Thresholds for Single vs. Multi-Finger Haptic Interaction" (2010 IEEE Haptics Symposium).

Thus the deformation equation may be rewritten as follows:

$$0.05N < F = \frac{192}{12} E \text{ Width } f\left(\frac{e_c}{L_c}\right)^3 < 0.5N$$

For example, f>3 µm, that is to say more than three times the minimum deformation detectable by touch, and Width=10 mm.

Using the above equation, it is possible to determine the remaining parameters of interest, namely the Young's modulus of the hinge and its dimensions $L_c$ and $e_c$, in various ways.

For example the material to be used is imposed and a calculation rule is obtained for the ratio $$\frac{e_c}{L_c}.$$

For example an equivalent Young's modulus E comprised between 0.5 GPa and 8.5 GPa is set so as to encompass a plurality of polymers.
From the deformation equation established hereinabove, it is possible to obtain the minimum and maximum values of the ratios $$\frac{e_c}{L_c},$$

that is to say those corresponding to a normal force of 0.05 N to 0.5 N, respectively, as summarised in the table below.

TABLE 1

| E (GPa) | $\frac{e_c}{L_c}$ for 0.05N | $\frac{e_c}{L_c}$ for 0.5N |
|---|---|---|
| 0.5 | 0.059 | 0.128 |
| 1 | 0.047 | 0.101 |
| 2.5 | 0.035 | 0.075 |
| 8 | 0.024 | 0.051 |
| 8.5 | 0.023 | 0.05 |

Thus the overall minimum and maximum values of the ratio $e_c/L_c$ can be obtained for an equivalent Young's modulus E comprised between 0.5 GPa and 8.5 GPa:

$$0.023 < \frac{e_c}{L_c} < 0.128$$

In particular, for a support the equivalent Young's modulus of which is equal to 0.5 GPa, for example polyethylene (PE), the ratio $e_c/L_c$ is comprised between 0.059 and 0.128, which for some hinge lengths makes it possible to determine the minimum thickness value $e_{c_{min}}$ and the maximum thickness value $e_{c_{max}}$. The table below summarises such values for $L_c$ comprised between 1 and 7 mm.

TABLE 2

| $L_c$ (mm) | $e_{c_{min}}$ (µm) | $e_{c_{max}}$ (µm) |
|---|---|---|
| 1 | 59 | 128 |
| 2 | 119 | 255 |
| 3 | 178 | 383 |
| 4 | 237 | 511 |
| 5 | 296 | 639 |
| 6 | 356 | 766 |
| 7 | 415 | 895 |

For a support with an equivalent Young's modulus of 8.5 GPa, for example a composite material consisting of a carbon or glass fibre reinforced polymer, the ratio $e_c/L_c$ is, as indicated in the first table, comprised between 0.023 and 0.050. The following values for the minimum and maximum thickness of the hinge are obtained for $L_c$ comprised between 2 and 8 mm:

TABLE 3

| Lc (mm) | $e_{c_{min}}$ (µm) | $e_{c_{max}}$ (µm) |
|---|---|---|
| 2 | 46 | 99 |
| 3 | 69 | 149 |
| 4 | 92 | 199 |
| 5 | 115 | 248 |
| 6 | 138 | 298 |
| 7 | 161 | 348 |
| 8 | 184 | 397 |
| 9 | 207 | 447 |
| 10 | 231 | 497 |

For a support the equivalent Young's modulus of which is equal to 2.5 GPa, for example a polycarbonate (PC) support, the ratio $$\frac{e_c}{L_c}$$

is comprised between 0.035 and 0.075 which yields the values summarised in the table below for the minimum and maximum thickness of the hinge with $L_c$ comprised between 1 and 10 mm.

TABLE 4

| $L_c$ (mm) | $e_{c_{min}}$ (µm) | $e_{c_{max}}$ (µm) |
|---|---|---|
| 1 | 35 | 75 |
| 2 | 69 | 149 |
| 3 | 104 | 224 |
| 4 | 139 | 299 |
| 5 | 173 | 373 |
| 6 | 208 | 448 |
| 7 | 243 | 523 |
| 8 | 277 | 598 |
| 9 | 312 | 672 |
| 10 | 347 | 747 |

Other values for the dimensions of the hinge and/or its Young's modulus make it possible to obtain the sought haptic effect. For example, for a length $L_c$ comprised between 3 and 8 mm and a thickness $e_c$ comprised between 100 and 700 microns, a polyethyleneterephthalate (PET) type polymer film may be used, for example a Melinex® or Mylar® film, having a Young's modulus of approximately 3.5 GPa, or a polyethylenenaphthalate (PEN) type polymer film with a Young's modulus of approximately 5 GPa.

A tactile element 3 can be integrated into the structure 2 in ways other than that which has just been described.

In the example shown in FIG. 7a the support includes a supporting film 410 that may serve as a protection layer and a layer 400 for compensation of the thickness of the elements 3.

The tactile elements 3 are carried by the film 410 and their entire thickness is embedded in the compensation layer 400.

In the example considered here the flexible hinges 40 are dual layer hinges; they include the layer portions 400 and 410 situated in the regions between two adjacent elements 3, said layers being mechanically coupled in vibration when the elements 3 are excited. The hinges 40 for example have a thickness $e_c$ less than or equal to 800 microns.

The tactile elements 3 have an exterior surface 3a leading onto the tactile surface S. As shown, the hinges 40 may have an exterior surface 40a that comes to be flush with the exterior surface 3a of the tactile elements, to form a smooth surface with the latter that is substantially plane when the haptic structure 2 is laid flat. The compensation layer 400 may have substantially the same thickness as the tactile elements 3.

The user is able to touch the exterior surface 3a of the tactile elements 3 and/or the surface 40a of the hinges 40 of the interface directly on placing their finger in contact with the tactile surface S.

Alternatively, it is possible to cover the tactile elements 3 and the hinges 40 with a thin protection layer (not represented). This makes it possible to render the tactile surface uniform and to prevent the user feeling unwanted texture effect caused by the difference between the material of the elements and that of the hinges 40.

In the example shown in FIG. 7a the actuators 5 are preferably situated on the face 3b of the tactile elements 3 situated on the side of the supporting film 410, as shown. The tactile elements 3 provided with the actuators 5 are for example fixed to the support 4 using an insulative glue 55.

In the variant shown in FIG. 7b the support 4 includes a layer 420 to receive the elements 3 and a covering layer 430.

The receiving layer 420 forms housings 425 in the form of cups, each of which receives a tactile element 3. The covering layer 430, for example a flexible polymer film, covers the receiving layer 420 and the tactile elements 3 continuously, thus closing the housing 425 at the top.

The covering layer 430 also serves as a film protecting the tactile elements 3 for example.

In the example considered here, the free face 430a of the covering layer 43 defines the tactile surface S. The covering layer 430 is sufficiently thin to propagate the vibratory effect of the tactile elements 3 to the tactile surface S.

In this example the hinges 40 are multilayer hinges; they are defined as the portions of the support 4 situated between the elements 3 and including the layers 420 and 430. The hinges 40 have for example a thickness $e_c$ less than 800 microns.

The covering layer 430 has for example a thickness comprised between a few microns and few tens of microns.

In this variant the actuators 5 may be situated anywhere on the lower face of the element 3, that is to say between the tactile element 3 and the bottom of the housing 425 in the receiving layer 420, and/or the upper face of the tactile element 3, that is to say between the tactile element 3 and the covering layer 430.

When the actuators 5 are present on the opposite faces of an element 3, their excitation is preferably controlled in such a manner as to have the benefit of constructive vibratory interference between them.

The interface in accordance with the invention may further include, as shown in FIG. 8, a detection system 7, for example a capacitive system known in the prior art, enabling the detection of at least one point of contact of the finger of the user with the surface S.

The detection system has been schematically represented in FIG. 8 in the form of a member covering the tactile elements 3 and the support 4, but it may form part of the support 4 or be integrated into the tactile elements 3.

The interface 1 may further include one or more ancillary devices for enhancing the experience of the user, in particular by making it a multisensory experience.

Thus the interface 1 may include a flexible screen (not represented) which makes it possible to superpose an image on the tactile surface S and for example to give the user the impression of virtually touching what they observe on the screen. The interface 1 may further include one or more loudspeakers (not represented) to add an audio effect.

A haptic interface 1 in accordance with the invention can function in accordance with the steps shown in FIG. 9.

In the step 81 the interface is on standby, in the absence of a user in contact with the tactile surface S, and the tactile elements 3 are at rest.

In the step 82 the detection system 6 detects at least one point of contact of the user with the surface S and the control circuit 6 determines the location where the haptic effect or effects must be generated.

In the step 83 the control circuit 6 sends the appropriate control signals to actuate at least some of the actuators 5 so as to generate the desired haptic effect.

In the step 84 the actuators 5 concerned contract or expand by virtue of a reverse piezoelectric effect in accordance with an actuation amplitude corresponding to the signal received, generating by unimorph effect a vibration of the rigid element 3 with which they are in contact. The hinges 40 of the flexible support 4 situated between two excited tactile elements 3 are driven in vibration in turn.

In the step 85 the vibration of the tactile element or elements induced by the actuators and that of the hinges situated between two activated actuators are perceived by touch by the user on the surface S.

In the step 86 the user breaks contact with the tactile surface S and the interface may return to standby, for example if energy saving is desired.

The perception by touch generated in the step 85 comes from feeling vibration of the tactile elements 3 and the hinges 40, which can give the user the impression of touching a vibrating surface or a surface with a relief.

By actuating more or fewer tactile elements 3 it is possible to create relatively complex effects. Some are described hereinafter and shown in FIGS. 10a, 10b and 10c.

There is considered in the following examples a matrix 10 of identical tactile elements 3 of circular shape distributed uniformly over the matrix 10, in a quincunx. The tactile elements 3 each include an actuator 5 placed at their centre.

In the example shown in FIG. 10a a group 30 of tactile elements 3 belonging to the matrix 10 is actuated by the control circuit 6. The whole of the group 30, including the tactile elements 3 and the hinges 40, is caused to vibrate so as to transmit to a user U exerting a static contact on the surface a pulse corresponding to a tactile perception 60 of a "button effect", that is to say giving the user the impression of pressing a keyboard key.

In another example shown in FIG. 10b a plurality of groups 31 and 32 including tactile elements 3 and hinges 40 are caused to vibrate simultaneously or alternately in order to generate tactile perceptions 61 and 62 of a pseudo-relief effect, that is to say giving the user moving their finger in contact with the interface the impression of brushing reliefs, for example the peak of a mountain on a map displayed on a screen.

In another example shown in FIG. 10c groups 33 and 34 of tactile elements 3 and the corresponding hinges 40 are excited simultaneously or alternately in order to generate tactile perceptions 63 and 64 of a texture effect, that is to say giving the user moving their finger in contact with the interface the impression of touching the smooth surface 64 of the dial of a watch or the rougher surface 63 of its watch strap.

By moving their finger, the user is able to perceive a variation of friction, known as "squeeze-film effect", caused by the tactile elements 3 that for example generate an ultrasound mode or an evanescent wave when they are excited by the actuators 5.

In the examples that have just been described the tactile elements 3 of the same group may be activated with a vibration mode that is identical for all the tactile elements of the group or specific to each tactile element, according to the required effect.

The deformation of the hinges situated between the activated elements 3 depends on the vibration modes chosen.

Tactile elements 3 provided with piezoelectric actuators 5 may be produced by the steps shown in FIGS. 11 to 14 and described hereinafter.

First there is deposited, for example by screenprinting, a first layer 24 of an electrically conductive material, for example gold, on the upper face of a rigid plate 22, in particular a glass plate.

The layer 24 is discontinuous: it includes for example a plurality of separate sections 24a and 24b that form the electrical power supply tracks of the actuators 5 that will come into contact with the tactile elements 3.

The thickness of the plate 22 is for example 500 microns. The thickness of the layer 24 is for example 300 nm.

There are then added piezoelectric actuators 5 including for example a lower electrode 52, a piezoelectric or ferroelectric layer 54 and an upper electrode 56. Alternatively, the actuators 5 include only the layer 54.

The layer 54 that is situated between the two electrodes is for example of lead zirconate titanate (PZT) type. It may also consist of aluminium nitride (AlN), zinc oxide (ZnO) or any other piezoelectric or ferroelectric material that is appropriate. The layer 54 may furthermore be thinned and adjusted to the desired thickness.

In particular a commercial piezoelectric ceramic may be used, or the actuator 5 may be formed by depositing thin layers and shaping them on the plate 22, as described in the patent FR3082997.

As shown in FIG. 12, the lower electrode 52 of the piezoelectric actuators 5 may be connected to the track 24 by means of a layer 51 of conductive glue, for example silver paste, for example approximately 40 μm thick. The deformation of the piezoelectric layer 54 by the effect of a potential difference applied between the electrodes is transmitted to the plate 22 by unimorphic effect in the layer 51.

Each actuator 5 is then covered with an electrical insulation layer 58, for example made of a polymer material, in order to retain the actuator 5 and to insulate the electrodes 52 and 56.

Only a portion of the power supply track 24a remains uncovered, as shown in FIG. 12.

The insulating layer 58 is then thinned from the top in order to uncover the electrode 56 in order to deposit by inkjet printing or some other appropriate method a layer of conductive material 26 connecting the upper electrode 56 with the power supply track 24a as shown in FIG. 13.

Alternatively, the insulating layer 58 and the piezoelectric layer 54 may be thinned to the desired thickness and then a layer of conductive material 26 forming both the upper electrode and the connection to the track 24a deposited. If necessary the layer 26 is obtained by using a stencil and spraying gold and its thickness is for example 300 nm.

The plate 22 can then be cut in order to obtain tactile elements 3 of the desired size and provided with the intended number of actuators 5.

The tactile elements 3 obtained in this way may then be mounted on and fixed to a flexible substrate 4 to form a haptic structure 2, for example by the production steps described hereinafter with reference to FIGS. 14 to 17. In particular, a haptic structure such as that described above with reference to FIG. 7b may be obtained by the following steps.

First the tactile elements 3 are placed at the desired locations on a manufacturing support 100, for example a silicone plate, on which will have been formed beforehand a flexible layer 42, for example of SINK polymer, in particular by lamination, intended to form for example the aforementioned covering layer.

The tactile elements 3 are for example held in place by means of a layer 44 of rigid glue, for example of epoxy type, for example 40 microns thick, as shown in FIG. 14.

A layer 46 of conductive material is then deposited, for example a layer of gold 300 nm thick obtained by masking and spraying, in order to form the electrical connectors between each actuator 5 and the control circuit 6, as shown in FIG. 15.

An insulating layer 45, for example a bead of polymer, may be deposited around the tactile elements 3 beforehand.

The combination of the tactile elements 3 and their actuators 5 is then continuously covered, for example by lamination or by gluing, by a layer 42, in particular a soft polymer film, in order to form flexible bridges between the tactile elements 3, as shown in FIG. 16. The layer 42 is intended to form the aforementioned receiving layer.

Alternatively, the tactile elements 3 may be coated with a soft polymer.

Finally the manufacturing support is peeled away in order to expose the covering layer 43, the exposed surface defining the tactile surface S of the flexible haptic interface. The tactile surface may equally, as an alternative, be defined by the upper surface 2a of the haptic structure.

The interface 1 in accordance with the invention may be integrated into an item of clothing, for example a glove, as shown in FIG. 18a.

It may alternatively be integrated into a mobile device, for example a flexible telephone, as shown in FIG. 18b.

In other examples the haptic structure 2 may change shape according to the desired haptic effect, the interface 1 given its flexibility being a reconfigurable tangible object, as shown in FIG. 19. In that figure it is seen that the interface may be mechanically coupled to one or more actuators 11 that enable it to be deformed to impart to it a predefined shape corresponding to that of the object touching which it is required to simulate.

The invention claimed is:

1. A flexible haptic interface defining a tactile surface able to be contacted by a user, the flexible haptic interface comprising:
   a plurality of rigid tactile elements connected by a flexible support forming at least one hinge extending between at least two adjacent rigid tactile elements; and
   a plurality of actuators, there being for each of the rigid tactile elements at least one of the actuators in contact therewith, the actuators being arranged to transmit a mechanical excitation to the rigid tactile elements in order to drive in vibration the at least one hinge situated between the at least two adjacent rigid tactile elements with a vibration amplitude detectable by touch.

2. The flexible haptic interface of claim 1, wherein the flexible support has
   an equivalent Young's modulus in a range of from 0.5 to 8.5 GPa, and
   a ratio of a thickness at a level of the hinges to a spacing between the at least two adjacent rigid tactile elements, is in a range of from 0.023 to 0.128.

3. The flexible haptic interface of claim 1, further comprising:
   a control circuit configured to modulate signals sent to the actuators in order to mechanically induce a vibration of the rigid tactile elements and of the at least one hinge and to generate a haptic sensation on the tactile surface.

4. The flexible haptic interface of claim 1, wherein the flexible support is made of a polymer material.

5. The flexible haptic interface of claim 1, wherein the flexible support has a constant thickness at hinge level.

6. The flexible haptic interface of claim 1, wherein the flexible support has an equivalent Young's modulus in a range of from 2 to 5 GPa.

7. The flexible haptic interface of claim 1, wherein a spacing between two adjacent rigid tactile elements is in a range of from 1 to 10 mm.

8. The flexible haptic interface of claim 1, wherein at least some of the rigid tactile elements are polyhedral shaped.

9. The flexible haptic interface of claim 1, wherein at least some of the rigid tactile elements have constant thickness.

10. The flexible haptic interface of claim 1, wherein at least some of the rigid tactile elements have a surface area of at least 1 $cm^2$.

11. The flexible haptic interface of claim 1, wherein at least some of the rigid tactile elements are arranged in lines and/or columns.

12. The flexible haptic interface of claim 1, wherein each of the rigid tactile elements is provided with at least one of the actuators, extending over at least one face of the rigid tactile elements, and
   wherein the actuators are disposed on a vibration antinode of the rigid tactile elements.

13. The flexible haptic interface of claim 1, wherein the actuators are piezoelectric, ferroelectric, electromagnetic, or thermic.

14. The flexible haptic interface of claim 1, wherein the flexible support has a constant thickness, at hinge level, in a range of from 100 to 800 microns.

15. The flexible haptic interface of claim 1, wherein a spacing between two adjacent rigid tactile elements is in a range of from 3 to 8 mm.

16. The flexible haptic interface of claim 1, wherein all of the rigid tactile elements are polyhedral.

17. The flexible haptic interface of claim 1, wherein all of the rigid tactile elements are parallelepipedal.

18. A method for generating a haptic effect using the flexible haptic interface of claim 1, the method comprising:
   mechanically exciting the rigid tactile elements with the actuators disposed in contact with the rigid tactile elements, in order to drive in vibration the at least one hinge situated between the at least two adjacent rigid tactile elements with a vibration amplitude detectable by touch.

19. The method of claim 18, further comprising:
   first detecting a contact position of a user on the flexible haptic interface with a detection system; and
   thereafter, using a control circuit, modulating signals sent to the actuators as a function of detected position in order to excite the elements.

20. The method of claim 18, wherein the rigid tactile elements are excited mechanically at a frequency in a range of from 20 to 100 kHz.

* * * * *